United States Patent
Weinberg et al.

[11] Patent Number: 5,694,772
[45] Date of Patent: Dec. 9, 1997

[54] METHOD OF APPARATUS FOR DISPOSING OF NON-CONDENSABLE GASES PRESENT IN GEO FLUID

[75] Inventors: Joseph Weinberg, Netanya; Avinoam Leshem, Haifa; Uri Kaplan, Doar Na Emek Shorek, all of Israel

[73] Assignee: Ormat Industries Ltd., Yavne, Israel

[21] Appl. No.: 609,056

[22] Filed: Feb. 29, 1996

Related U.S. Application Data

[63] Continuation of Ser. No. 234,106, Apr. 28, 1994, abandoned.
[51] Int. Cl.$^6$ ............................................. F03G 7/04
[52] U.S. Cl. ............................... 60/641.2; 60/641.5
[58] Field of Search ............................ 60/641.2, 641.5

[56] References Cited

U.S. PATENT DOCUMENTS

| | | | |
|---|---|---|---|
| 4,244,190 | 1/1981 | Lieffers | 60/641.5 |
| 4,542,625 | 9/1985 | Bronicki | 60/641.2 |
| 4,967,559 | 11/1990 | Johnston | 60/641.2 |
| 4,996,846 | 3/1991 | Bronicki | 60/677 |
| 5,038,567 | 8/1991 | Mortiz | 60/641.5 |

Primary Examiner—Alfred Basichas
Attorney, Agent, or Firm—Donald M. Sandler

[57] ABSTRACT

A stream of non-condensable gases that include hydrogen sulfide which are produced by a geothermal plant are disposed of by first compressing at least a part of the stream to form compressed gases. Spent geothermal liquid produced by the power plant is pressurized, and directly contacted with the compressed gases to produce an effluent containing substantially all of the hydrogen sulfide, which can be disposed of in a re-injection well, and a stream of pressurized gases substantially free of hydrogen sulfide which can be released to the atmosphere. Before the stream of pressurized gases are released to the atmosphere, such stream preferably is expanded in a turbine for producing power. Also, preferably, this power so produced is used to compress the non-condensable gases thus reducing the net power consumed. In a further alternative, where chemicals are utilized, almost all of the hydrogen sulfide is stripped from the stream of gases. Only the stripped stream, which contains almost all of the hydrogen sulfide, is compressed prior to injecting these gases into a re-injection well.

42 Claims, 3 Drawing Sheets

FIG. 3

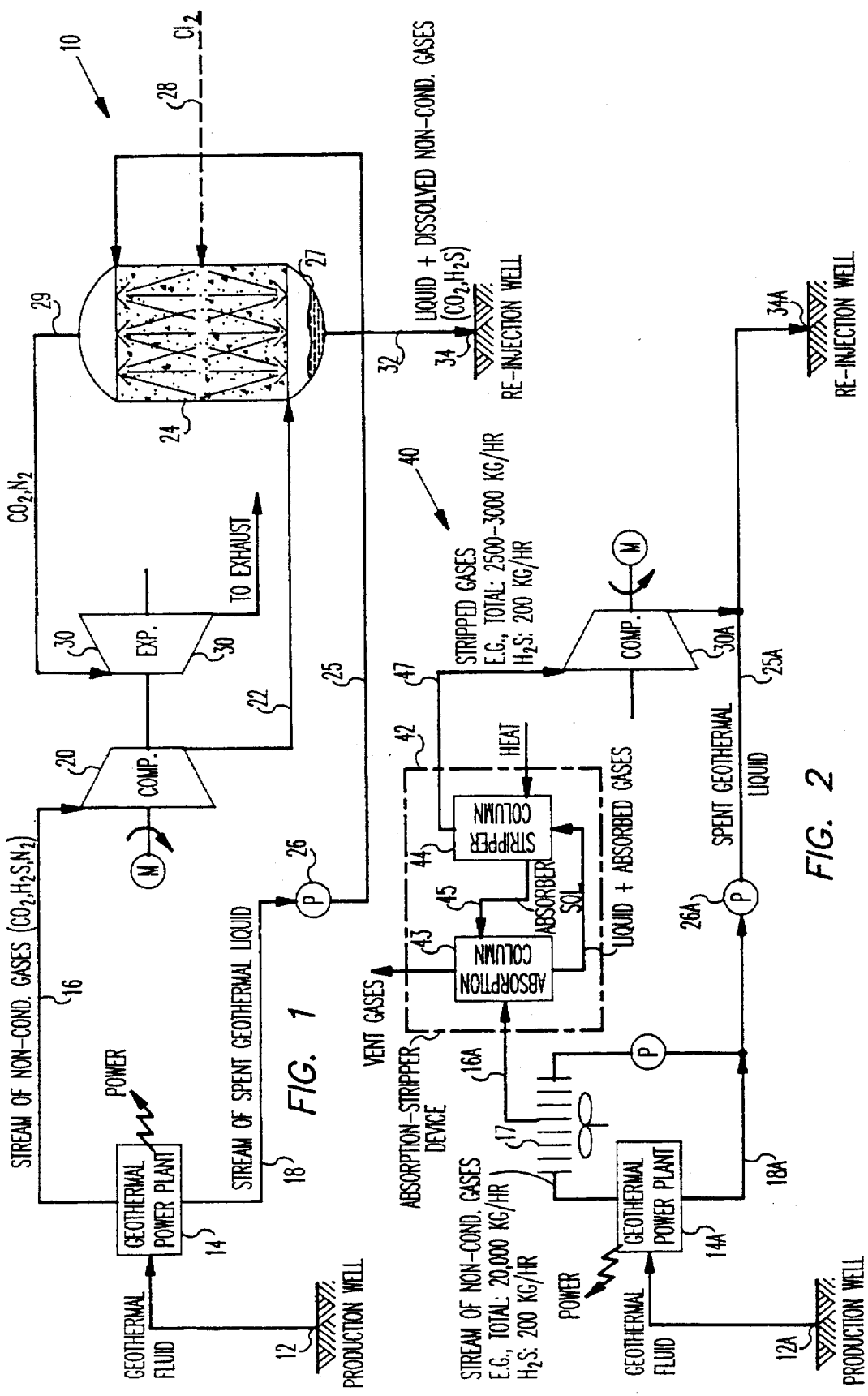

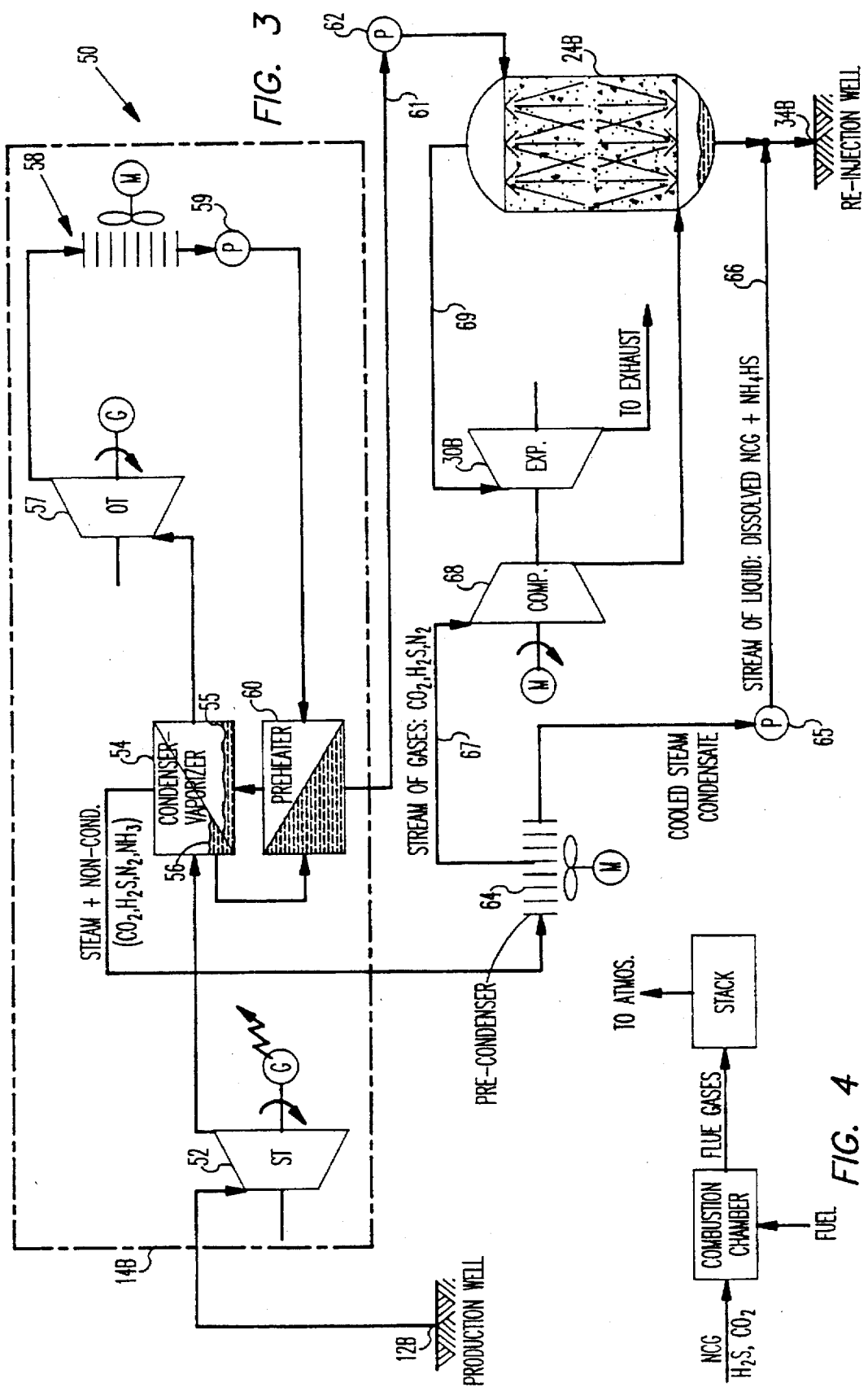

METHOD OF APPARATUS FOR DISPOSING OF NON-CONDENSABLE GASES PRESENT IN GEO FLUID

This application is a continuation of application Ser. No. 08/234,106, filed Apr. 28, 1994, now abandoned.

TECHNICAL FIELD

This invention relates to a method of and apparatus for disposing of non-condensable gases present in geothermal fluid extracted from a production well for useful purposes such as generating power.

BACKGROUND OF THE INVENTION

Power plants that operate on geothermal fluid extracted from production wells have been constructed in many countries and currently are in operation producing large quantities of power. A form of such a plant is similar to that shown in U.S. Pat. No. 4,542,625, the disclosure of which is hereby incorporated by reference. In the '625 patent, geothermal fluid in the form of geothermal steam is extracted from a production well and applied to a steam turbine that drives a generator. Expansion of the steam in the turbine causes the generator to supply an electrical load. The heat-depleted steam exhausted from the turbine is condensed by indirect contact with an organic fluid that is vaporized as a result. The organic fluid is part of a closed Rankine cycle power plant that also supplies the electrical load.

Other methods and means for producing power from geothermal fluids include power plants incorporating condensing steam turbines where a water-cooled condenser operates at vacuum conditions.

In the system disclosed in the '625 patent, the steam condensate produced by the condenser is conveyed to a re-injection well and so disposed of. Non-condensable gases, comprising carbon dioxide, hydrogen sulfide, and sometimes small amounts of ammonia, hydrocarbons, nitrogen, and hydrogen, present in the geothermal steam exhausted from the turbine should be removed from the condenser to ensure efficient heat transfer conditions. In addition, the large volume of non-condensable gases in the system, even if their weight percentage is relatively small, brings about difficulties in ensuring steady flow conditions of the steam condensate.

To ensure efficient heat transfer conditions, the '625 patent discloses extracting the gases, pressurizing them, and then combining the pressurized gases with the steam condensate before the mixture is applied to a re-injection well. This technique provides an environmentally safe way to dispose of both the gases and the steam condensate.

In power plant installations incorporating condensing steam turbines, non-condensable gases obtained at vacuum must be pressurized to a level above atmospheric pressure by auxiliary equipment. Conventionally, such equipment includes ejectors, or vacuum pumps, or a combination thereof. In this manner, the non-condensable gases can be treated in a manner similar to the way in which pressurized steam condensate is treated, or in another suitable manner.

Since the '625 patent issued in 1985, various modifications have been made to take into account the different types of geothermal fluid that is available in different fields. For example, the geothermal fluid produced at the production well may be strictly brine, strictly steam, or a mixture of steam and brine. Preprocessing of the fluid is also employed utilizing separators that divide the geothermal fluid into brine and vapor streams that are separately processed to produce power. In almost every case, however, quantities of non-condensable gases as well as steam condensate and brine are produced and must be disposed of in environmentally safe ways.

Extraction of the non-condensable gases, compressing them, and then re-injecting them into the ground with the spent geothermal fluid produced by a power plant can be expensive in terms of the power requirements for the gas compression operation, particularly in installations where the percentage of non-condensables in the geothermal fluid is high. An additional problem sometimes develops by reason of the creation of gas pockets in the geological formations into which the spent geothermal fluid is re-injected. Such gas pockets inhibit disposal of non-condensables into the ground, and disrupt the efficient operation of the power plant.

When problems of this nature occur, chemical abatement systems are sometimes brought into use. Such systems utilize conventional chemicals to bind the sulfur present in the hydrogen sulfide in the non-condensables so that the gases released to the atmosphere are environmentally safe. However, the sulfur compounds produced by the chemical reactions must nevertheless be disposed of, and this often is difficult or expensive.

It is therefore an object of the present invention to provide a new and improved method of and apparatus for disposing of non-condensable gases present in geothermal fluid extracted from a production well and used for generating power, where such method and apparatus substantially overcome many of the problems described above.

BRIEF DESCRIPTION OF THE INVENTION

According to the present invention, at least a part of a stream of non-condensable gases and vapors produced by a geothermal plant or power plant, which includes substantially all of the hydrogen sulfide (e.g., about 80% or more), are disposed of by compressing the stream to form compressed gases. Spent geothermal liquid also produced by the power plant is pressurized and directly contacted with the compressed gases to produce an effluent containing substantially all of the hydrogen sulfide dissolved therein. This effluent can be disposed of in a re-injection well, and a stream of pressurized gases substantially free of hydrogen sulfide can be released to the atmosphere. The geothermal power plant may have a water cooled condenser operating under vacuum conditions The term "geothermal plant" is intended to mean a facility that uses heat contained in geothermal fluid for district heating, for example, or in industrial processes.

Before the stream of pressurized gases are released to the atmosphere, such stream preferably is expanded in a turbine for producing power. Also, preferably, this power so produced is used to compress the non-condensable gases thus reducing the net power consumed.

In an optional configuration, chlorine may be added to the process during which the compressed gases and the pressurized liquid are contacted. This has the beneficial effect of further reducing free hydrogen sulfide in the vented gases.

In one embodiment of the invention, mechanical means are used to compress substantially the entire stream of non-condensable gases. However, chemical means can also be used; and in such case, less than the entire stream of non-condensable gases is compressed. When chemical means are used, substantially all of the hydrogen sulfide is stripped from the stream of non-condensable gases to produce a stripped stream of gases that contain almost all of the hydrogen sulfide in the stream of non-condensables. Only this reduced stream is compressed; and the gases that remain after the stripping operation occurs are vented. For example, where the initial concentration of hydrogen sulfide is very low, such as about 1% by weight of the total non-condensable gases and vapor stream, the stripped gases containing substantially all of the hydrogen sulfide, can constitute less than about 10% by weight of the stream of non-condensable gases. As a result, this embodiment requires compression of a substantially smaller amount of non-condensable gases as compared to the previously described embodiment.

In a further embodiment effective in reducing the temperature of the non-condensable gases and vapors, as well as the amounts that have to be compressed, a stream of liquid containing dissolved non-condensable gases and $NH_4HS$ is produced if ammonia is present in the non-condensables. Another stream is also produced containing non-condensable gases having reduced amounts of hydrogen sulfide and also a reduced amount of non-condensable gases and vapors due to the condensation of water vapor present in this stream. Only the last mentioned stream is compressed and then contacted with pressurized spent geothermal liquid to produce an effluent containing substantially all of the hydrogen sulfide, and a stream of pressurized gases substantially free of hydrogen sulfide which can be vented to the atmosphere. In this embodiment, the stream of liquid containing dissolved non-condensable gases and $NH_4HS$ can be directly disposed of in a re-injection well. Preferably, the stream of pressurized gases is expanded for producing power before being vented; and the power so produced is used to compress said non-condensable gases.

BRIEF DESCRIPTION OF THE DRAWINGS

Embodiments of the present invention are described by way of example with reference to the accompanying drawings:

FIG. 1 is a schematic block diagram of a first plant shown in association with a general type of geothermal power plant according to the present invention, and wherein all of the non-condensables produced by the power plant are compressed;

FIG. 2 is a schematic block diagram of a second plant shown in association with a general type of geothermal power plant according to the present invention using chemical means, wherein only portion of the non-condensables are compressed;

FIG. 3 is a schematic block diagram of a third plant shown in association with a specific type of geothermal power plant according to the present invention, and wherein only a portion of the non-condensables produced by the power plant are compressed;

FIG. 4 is a modification showing a system for combusting the non-condensables for producing sulfur dioxide that can be disposed of, or further processed.

DETAILED DESCRIPTION

Figure 5:
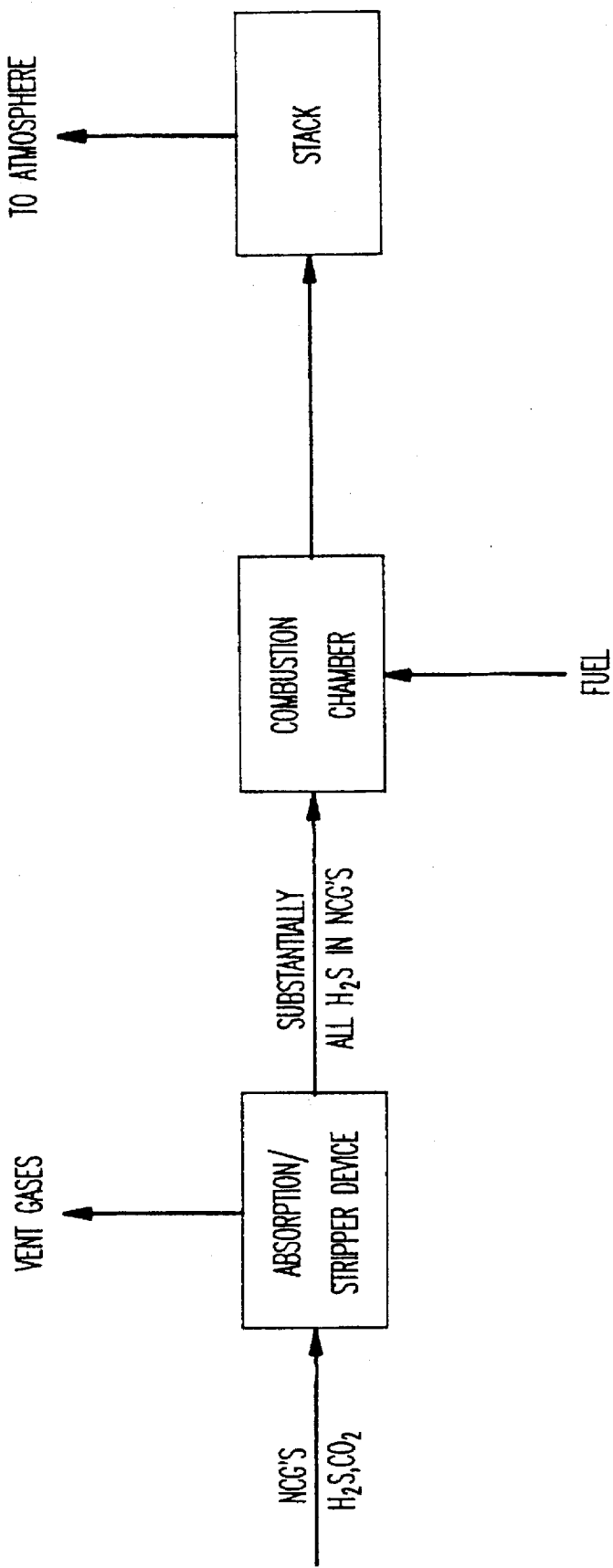
FIG. 5 is another modification showing a system for combusting substantially all of the hydrogen sulfide contained in the non-condensables for producing sulfur dioxide that can be disposed of or further processed.

Turning now to the drawings, reference numeral 10 designates a first plant according to the present invention for disposing of non-condensable gases, such as $CO_2$, $H_2S$, $NH_3$, and $N_2$, for example, present in geothermal fluid produced by production well 12 and used in geothermal plant, or power plant 14. The geothermal fluid produced by well 12 may be geothermal steam, geothermal brine, or a mixture of brine and steam. Plant 14 schematically represents apparatus for generating power from the geothermal fluid produced by well 12, and producing, as by-products, stream 16 of non-condensable gases, and stream 18 of spent geothermal liquid (e.g., steam condensate).

As is well known, and specifically, as shown in the '625 patent, steam in, or produced by flashing, the geothermal fluid from well 12 and used for heat exchange purposes should be purged of non-condensable gases to maintain heat transfer efficiency. Furthermore, the large volume of non-condensables gases in the system, even if their weight percentage is relatively small, could bring about difficulties in ensuring steady flow conditions of the steam condensate. It is these gases that constitute stream 16. Furthermore, after heat has been extracted from the geothermal fluid by a power plant having turbogenerators (not shown) in plant 14, the liquid remaining produces stream 18.

Stream or interconnector 16 is applied to the input of motor driven compressor 20 which serves to compress substantially the entire stream of non-condensable gases produced by plant 14 to form a stream of compressed gases in line 22 which is applied to packed tower 24 wherein the liquid (e.g., steam condensate) in stream 18, after being pressurized by pump 26, is directly contacted by the compressed gases from line 22. Certain components of the non-condensable gases, mainly $H_2S$, dissolve in the liquid in tower 24, producing an effluent rich in such components, particularly hydrogen sulfide. Tower 24 thus serves as means for directly contacting the compressed gases from plant 14 with the pressurized liquid from the plant to thereby produce effluent 27 that is rich in dissolved $H_2S$. By proper design of tower 24, and selection of the temperature and pressures of the fluids that are directly contacted in the tower, substantially all of the $H_2S$ in stream 16 will dissolve in the spent geothermal liquid.

Effluent 27, which is pressurized, is conveyed by piping 32 to re-injection well 34 for re-injection with, if preferred, other geothermal or spent geothermal liquids or fluids so that the effluent is dissipated into a geological formation without the problems attendant to dissipating a mixture of gases and liquid. To enhance the dissolving of the $H_2S$ gas into the pressurized spent geothermal liquid, chlorine, or chlorine-based compounds, may be introduced into tower 24 as indicated at 28.

The contacting of the compressed gases in line 22 with the pressurized liquid (e.g., steam condensate) in line 25, which occurs in tower 24, produces a stream of pressurized gases in line 29 which are substantially free of $H_2S$ gas. These gases, including mainly $CO_2$ and $N_2$, will be so free of $H_2S$ that they can be vented to the atmosphere without creating any ecological problems. Preferably, venting of the gases is effected after the gases expand in expander 30 producing power. To reduce the energy required to drive compressor 20, expander 30 may be coupled directly to the compressor thus reducing the net power required to operate the system. Furthermore, the spent geothermal liquid (e.g., steam condensate) also may be pressurized by having it flow downwardly through a vertical distance or height difference.

A larger reduction in the amount of non-condensable gases to be compressed for re-injection into the ground may be achieved by embodiment 40 shown in FIG. 2 which differs from embodiment 10 in FIG. 1 by reason of the compression of less than the entire stream of non-condensable gases produced by the power plant. In embodiment 40, stream 16A of non-condensable gases is applied to interconnector, or absorption-stripper device 42 by which substantially all of the $H_2S$ in stream 16A is first absorbed in an absorber in absorption column 43 and then stripped in stripper column 44 to produce stripped stream of gases 47 which are applied to compressor 30A. The gases so compressed are combined with pressurized spent geothermal liquid (e.g., steam condensate) in line 25A and conveyed by piping 32A to re-injection well 34A for re-injection with, if preferred, other geothermal or spent geothermal liquids or fluids.

Device 42 shown in FIG. 2 is a conventional device that operates on the principles schematically shown in the drawing. Specifically, device 42 includes absorption column 43 and stripper column 44. An amine-based, or other suitable liquid absorber solvent is applied to column 43 via piping 45. In its contact with the gases in stream 16A, the solvent absorbs substantially all of the $H_2S$ and a small portion of the other non-condensables, like $CO_2$. The liquid and absorbed gases flow out of column 43 via piping 46 into column 44 where heat is added (e.g., by a steam boiler, or re-boiler) driving the absorbed gases out of the liquid and regenerating the solvent for use in column 43.

As a consequence of the operation of column 43, the gases that exit the column are substantially free of $H_2S$ and safely may be vented to the atmosphere, if preferred. As a consequence of the operation of column 44, the gases that exit the column contain substantially all of the $H_2S$. The amount of gases that exit column 44 is much smaller than the amount of gases in stream 16A. In one installation, if 20,000 Kg/hr. of non-condensable gases containing 200 Kg/hr. of $H_2S$ are processed by device 42, about 2500–3000 Kg/hr. of gases, containing the 200 Kg/hr. of $H_2S$ will exit column 44. Thus, instead of compressor 30A having to compress 20,000 Kg/hr. of non-condensables, only 2500–3000 Kg/hr. will have to be compressed. This is a significant reduction in power consumption for compression, and is highly desirable for this reason alone.

In order to cool the non-condensable gases exiting geothermal plant or power plant 14A and applied to device 42 in stream 16A, and also to condense steam present with the non-condensable gases, cooler 16A (shown as being air cooled) can be used. As a result, some of the steam condenses, and some of the non-condensable gases dissolve in the steam condensate. Consequently, less non-condensable gases and vapors need to be treated by device 42. Hence, the amount of non-condensable gases and vapor compressed by compressor 30A is further reduced.

In order to reduce the amount of non-condensable gases and vapors to be compressed in the embodiment described by way of example in relation to FIG. 1, and also to cool the non-condensable gases and vapors, the embodiment of the present invention described by way of example in relation to FIG. 3, including precondenser 64, can be used.

FIG. 3 shows the use of pre-heaters in the organic fluid loop. However, FIG. 3 could also be used in installations where the geothermal power plant is configured as shown in the '625 patent, i.e., without pre-heaters.

Plant, or power plant 14B shown in FIG. 3 includes production well 12B which produces geothermal fluid containing geothermal steam, brine, and non-condensable gases that include ammonia. The geothermal steam, either directly as shown, or as produced by a separator, is applied to steam turbine 52 which drives a generator that is connected to an electrical load. Expanded steam exhausted from the turbine is applied to heat exchanger 54 which operates as a vaporizer for vaporizing liquid organic fluid 55, such as pentane, or isopentane, for example; and the expanded steam in heat exchanger 54 is converted to steam condensate 56.

Vaporized organic fluid from heat exchanger 54 is applied to organic turbine 57 wherein expansion takes place driving a generator that supplies an electrical load. The expanded organic vapor is condensed in condenser 58, shown as being air cooled, producing organic condensate that is returned, via heat exchanger 60, to heat exchanger 45 by pump 59. Heat exchanger 60, which receives steam condensate 56 from heat exchanger 54, pre-heats the organic fluid from the temperature of condenser 58 to substantially the temperature of the organic vapor produced by heat exchanger 54. The steam condensate in pre-heater 60 loses some sensible heat and is piped at 61 to pump 62 where the condensate is pressurized and applied to tower 24B. Such a power plant also can be used for power plants 14 and 14A shown in FIGS. 1 and 2, also without pre-heaters.

Some steam, and the non-condensables in the expanded steam produced by turbine 52, are extracted from heat exchanger 54 and applied via interconnector 60 to pre-condenser 64, shown as being air cooled. The steam present condenses to substantially ambient temperature which is lower than the temperature of condensate 56. As a consequence, the volume of the non-condensable gases and the vapors present is reduced, a portion of the hydrogen sulfide is dissolved in the steam condensate, and ammonia, if present in the non-condensables, reacts with the steam condensate and the $H_2S$ to produce ammonium hydrosulfide ($NH_4HS$). Some of the other non-condensables also dissolve in the condensate. This reduces the absolute amount of hydrogen sulfide in the non-condensable gases remaining in pre-condenser 64 without using any other equipment.

The liquid that exits pre-condenser 64 is thus a liquid stream containing dissolved non-condensables and $NH_4HS$. This liquid is pressurized by pump 65, and is conveyed via piping 66 to re-injection well 34B for re-injection with, if preferred, other geothermal or spent geothermal liquids or fluids.

The non-condensables that remain in gaseous form in pre-condenser 64 are drawn off at 67 by the operation of compressor 68 in the form of a stream of non-condensables containing a reduced amount of hydrogen sulfide. Compressor 68 compresses this stream, and applies it to tower 24B wherein the remaining $H_2S$ in the non-condensables is absorbed in the pressurized steam condensate. The result is a stream of pressurized non-condensables substantially free of $H_2S$ that exit tower 24B at 69 and are vented to the atmosphere. Preferably, the pressurized stream is expanded in expander 30B before being vented; and the expander is preferably directly coupled to compressor 68. Also here, if preferred, chlorine can be applied to tower 24B for enhancing the dissolving or absorption of hydrogen sulfide in the pressurized steam condensate.

Embodiment 50 thus operates to reduce the amount of non-condensables gases compressed. A stream of liquid containing dissolved non-condensable gases and $NH_4HS$ is produced in piping 66. At the same time, a stream of non-condensable gases containing a reduced amount of hydrogen sulfide and other non-condensable gases is produced in piping 67. The last mentioned stream, which contains a reduced amount of hydrogen sulfide and other non-condensable gases, is compressed by compressor 68 as distinct from the non-condensables present in heat exchanger 54.

Finally, and alternatively, non-condensables from the plant or power plant can be disposed of by applying them to a combustion chamber wherein they can be combusted with fuel, if necessary, producing an environment wherein the sulfur present in the non-condensables form oxides of sulfur which can be disposed of into the atmosphere, if permitted, or further processed to produce other compounds of sulfur. An example of this arrangement is shown in FIG. 4.

In still another alternative, a stream containing substantially all of the hydrogen sulfide present in the non-condensables can be produced from the stream coming from the plant or power plant in a manner similar to that described in relation to FIG. 2. In such case, the stream containing substantially all of the hydrogen sulfide may be applied to a combustion chamber for combusting with fuel if necessary. An example of such an arrangement is shown in FIG. 5. In this case, the amount of fuel added, if this is necessary, will be less than that used when needed in the previously mentioned alternative.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. A method for disposing of non-condensable gases that include hydrogen sulfide and which are present in geothermal fluid used in a geothermal plant of the type that produces a gaseous stream that includes the non-condensable gases, and a stream of spent geothermal liquid, said method comprising:
   a) compressing at least a part of said gaseous stream to form compressed gases;
   b) pressurizing the spent geothermal liquid;
   c) directly contacting the compressed gases with the pressurized liquid for dissolving certain components of said compressed gases and producing a stream of pressurized gases substantially free of hydrogen sulfide, and a liquid effluent;
   d) disposing of said liquid effluent in a re-injection well; and
   e) releasing said stream of pressurized gases to the atmosphere.

2. A method according to claim 1 wherein the contacting of the compressed gases with the pressurized liquid causes hydrogen sulfide to dissolve in the liquid.

3. A method according to claim 2 wherein the stream of pressurized gases substantially free of hydrogen sulfide is expanded for producing power.

4. A method according to claim 3 wherein said power is used in compressing said gaseous stream.

5. A method according to claim 2 including contacting the compressed gases and the pressurized liquid with chlorine.

6. A method according to claim 3 including contacting the compressed gases and the pressurized liquid with chlorine.

7. A method according to claim 2 including compressing substantially the entire gaseous stream.

8. A method for disposing of non-condensable gases that include hydrogen sulfide and which are present in geothermal fluid used in a geothermal plant of the type that produces a stream of non-condensable gases, and a stream of spent geothermal liquid, said method comprising:
   a) compressing substantially less than the entire stream of non-condensable gases to form compressed gases;
   b) pressurizing the spent geothermal liquid;
   c) directly contacting the compressed gases with the pressurized liquid for causing hydrogen sulfide to dissolve in said spent geothermal liquid and and producing an effluent; and
   d) disposing of the effluent in a re-injection well.

9. A method according to claim 8 including chemically removing substantially all of the hydrogen sulfide from the stream of non-condensable gases.

10. A method according to claim 9 including stripping substantially all of the hydrogen sulfide from said stream of non-condensable gases to produce a stripped stream of gases, and compressing only said stripped stream.

11. A method according to claim 10 including venting the gases remaining after the hydrogen sulfide is stripped from the stream of non-condensables.

12. A method according to claim 1 wherein said gaseous stream comprises hydrogen sulfide, steam and at least one gas selected from the group consisting of ammonia, carbon dioxide, and nitrogen, including reducing the temperature of the gaseous stream to produce a stream of liquid comprising condensed steam within which a portion of the hydrogen sulfide and said at least one gas in said group are dissolved, and a reduced stream of gases having a reduced amount of hydrogen sulfide and said at least one gas in said group, and compressing only said reduced stream of gases.

13. A method according to claim 12 including directly disposing of said stream of liquid containing dissolved non-condensable gases in said re-injection well.

14. A method for disposing of non-condensable gases that include hydrogen sulfide and which are present in geothermal fluid used in a geothermal plant of the type that produces a gaseous stream containing said non-condensable gases, and a stream of spent geothermal liquid, said method comprising:
   a) extracting hydrogen sulfide from said gaseous stream producing a stream of remainder gases substantially free of hydrogen sulfide;
   b) venting said remainder gases to the atmosphere;
   c) pressurizing the spent geothermal liquid;
   d) disposing of the pressurized spent geothermal liquid and extracted hydrogen sulfide in a re-injection well.

15. A method according to claim 14 wherein the step of extracting hydrogen sulfide from said gaseous stream includes compressing at least a part of said gaseous stream to form compressed gases, and contacting the compressed gases with the pressurized liquid for causing hydrogen sulfide in the compressed gases to dissolve in the liquid which forms an effluent.

16. A method according to claim 15 including expanding the remainder gases for producing power.

17. A method according to claim 16 wherein said power is used in compressing said gaseous stream.

18. A method according to claim 14 wherein the step of extracting hydrogen sulfide from said gas stream includes chemically treating said gaseous stream for producing said remainder gases and for producing stripped gases containing hydrogen sulfide, said method further including compressing said stripped gases, and combining said stripped gases with the pressurized geothermal liquid to form an effluent, and disposing of said effluent in a re-injection well.

19. A method according to claim 14 wherein said gaseous stream contains steam, and said method includes cooling said gaseous stream before the hydrogen sulfide is extracted for forming steam condensate in which portions of the non-condensable gases are dissolved, and for forming a reduced stream of gases, and combining the steam condensate with said spent geothermal liquid.

20. A method according to claim 19 including chemically treating said reduced stream of gases to produce said remainder gases, and to produce stripped gases containing hydrogen sulfide, compressing said stripped gases and combining said stripped gases with the pressurized geothermal liquid to form an effluent, and disposing of said effluent in a re-injection well.

21. A method according to claim 19 including compressing said reduced stream of gases, and directly contacting the compressed gases with the pressurized liquid for producing an effluent which contains hydrogen sulfide, and which is disposed of in said re-injection well, and for producing remainder gases substantially free of hydrogen sulfide.

22. A method according to claim 21 including expanding said remainder gases to produce power, and venting the expanded remainder gases to the atmosphere.

23. A method according to claim 22 including utilizing said power to compress said gaseous stream.

24. Apparatus for disposing of non-condensable gases that include hydrogen sulfide and which are present in geothermal fluid used in a geothermal power plant of the type that produces a gaseous stream that includes the non-condensable gases, and a stream of spent geothermal liquid, said apparatus comprising:
   a) a compressor for compressing at least a part of said gaseous stream to form a stream of compressed gases;
   b) means for pressurizing the spent geothermal liquid;
   c) means for contacting the stream of compressed gases with the pressurized liquid to produce a stream of pressurized gases substantially free of hydrogen sulfide, and to produce an effluent containing substantially all of the hydrogen sulfide dissolved therein;
   d) means for disposing of the effluent in a re-injection well; and
   e) means for releasing said stream of pressurized gases to the atmosphere.

25. Apparatus according to claim 24 wherein said means for releasing said stream of pressurized gases includes an expander for expanding the stream of pressurized gases before they are released and producing power.

26. Apparatus according to claim 25 wherein said expander drives said compressor.

27. Apparatus according to claim 24 including means for adding chlorine to said column.

28. Apparatus according to claim 27 including an interconnector for interconnecting said compressor with said power plant, said interconnector being constructed and arranged so that substantially the entire stream of non-condensable gases is compressed by said compressor.

29. Apparatus according to claim 24 including an interconnector for interconnecting said compressor with said power plant, said interconnector being constructed and arranged so that less than the entire stream of non-condensable gases is compressed by said compressor.

30. Apparatus according to claim 29 wherein said interconnector includes an absorption/stripper device constructed and arranged to strip substantially all of the hydrogen sulfide from said stream of non-condensable gases to produce a stripped stream of gases, and means for applying only said stripped stream to said compressor.

31. Apparatus according to claim 30 wherein the means for contacting the compressed gases with the pressurized liquid to produce an effluent containing substantially all of the hydrogen sulfide dissolved therein, includes means for contacting the stripped stream of gases after they have been compressed with the pressurized liquid to produce a pressurized effluent containing substantially all of the hydrogen sulfide dissolved therein.

32. Apparatus according to claim 31 wherein the means for disposing of the effluent in a re-injection well includes means for disposing of the pressurized sulfur-rich effluent.

33. Apparatus for use with a source of geothermal fluid that includes non-condensable gases such as hydrogen sulfide and other gases, said apparatus comprising:
   a) a geothermal power plant including: a steam turbine for use with steam produced from said geothermal fluid for generating power and producing expanded steam; a heat exchanger responsive to said expanded steam for vaporizing an organic fluid in the heat exchanger and producing vaporized organic fluid, steam condensate, and non-condensable gases; an organic turbine responsive to the vaporized organic fluid for expanding the vaporized organic fluid and producing power and expanded vaporized organic fluid; and an organic fluid condenser for receiving said expanded vaporized organic fluid and condensing the same producing organic fluid condensate; a pre-heater heated by steam condensate; and means for returning the organic fluid condensate to the heat exchanger through said pre-heater;
   b) a pre-condenser that receives vapor, steam and said non-condensable gases from said heat exchanger and produces a condensate cooler than the steam condensate and which includes dissolved non-condensable gases and $NH_4HS$, and a stream of non-condensable gases;
   c) a compressor for compressing said stream of non-condensable gases to form compressed gases;
   d) means for pressurizing said steam condensate;
   e) a column for contacting the compressed gases with the pressurized steam condensate to produce an effluent containing substantially all of the hydrogen sulfide dissolved therein; and
   f) means for disposing of the effluent in a re-injection well.

34. Apparatus according to claim 33 wherein said column produces a stream of pressurized gases substantially free of hydrogen sulfide, and said apparatus further includes an expander for expanding the stream of pressurized gases and producing power.

35. Apparatus according to claim 34 wherein said expander drives said compressor.

36. Apparatus according to claim 34 including means for adding chlorine to said column.

37. A method according to claim 1 wherein the spent geothermal liquid flows through a vertical distance before it is contacted by said compressed gases thus pressurizing the spent geothermal liquid without a pump.

38. Apparatus according to claim 24 wherein said means for pressurizing the spent geothermal liquid is a pump.

39. Apparatus for use with a geothermal plant that operates on geothermal fluid, and produces a gaseous stream comprising hydrogen sulfide and at least one gas selected from the group consisting of ammonia, carbon dioxide, nitrogen, and steam, and a stream of spent geothermal liquid, said apparatus comprising:
   a) means for extracting hydrogen sulfide from said gaseous stream and producing a stream of remainder gases substantially free of hydrogen sulfide;
   b) means for venting said remainder gases to the atmosphere;
   c) means for pressurizing the spent geothermal liquid; and d) means for disposing of the pressurized spent geothermal liquid and extracted hydrogen sulfide in a re-injection well.

40. Apparatus according to claim 39 wherein said means for extracting includes:

a) a cooler for cooling said gaseous stream to produce a stream of steam condensate within which a portion of the hydrogen sulfide and other gases in said group are dissolved, and to produce a reduced stream of gases having reduced amounts of hydrogen sulfide and other gases in said group; and b) means chemically removing substantially all of the hydrogen sulfide from said reduced stream of gases for producing said remainder gases substantially from of hydrogen sulfide, and stripped gases gases containing substantially all of the hydrogen sulfide in the gaseous stream.

41. Apparatus according to claim 40 including means for compressing said stripped gases, and means for combining the compressed stripped gases with the pressurized spent geothermal liquid.

42. Apparatus according to claim 39 wherein said means for extracting includes:

a) a cooler for cooling said gaseous stream to produce a stream of steam condensate within which a portion of the hydrogen sulfide and other gases in said group are dissolved, and to produce a reduced stream of gases having reduced amounts of hydrogen sulfide and other gases in said group;

b) means for compressing said reduced stream of gases;

c) means directly contacting the compressed stream of gases with pressurized spent geothermal liquid for producing an effluent containing dissolved hydrogen sulfide, and said stream of remainder gases.

* * * * *